(12) United States Patent
Ohtake et al.

(10) Patent No.: US 10,360,931 B2
(45) Date of Patent: Jul. 23, 2019

(54) MAGNETIC RECORDING APPARATUS

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Masaya Ohtake, Fujisawa Kanagawa (JP); Akihiko Takeo, Kokubunji Tokyo (JP); Gaku Koizumi, Yokohama Kanagawa (JP); Yusuke Tomoda, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/113,094

(22) Filed: Aug. 27, 2018

(65) Prior Publication Data

US 2019/0189149 A1  Jun. 20, 2019

(30) Foreign Application Priority Data

Dec. 20, 2017  (JP) .................................. 2017-243988

(51) Int. Cl.
  *G11B 5/21*  (2006.01)
  *G11B 5/31*  (2006.01)
  *G11B 5/60*  (2006.01)

(52) U.S. Cl.
  CPC ............ *G11B 5/312* (2013.01); *G11B 5/6082* (2013.01)

(58) Field of Classification Search
  CPC .. G11B 5/31; G11B 5/312; G11B 5/60; G11B 5/6082
  USPC .................. 360/125.1–125.7, 125.31–125.35
  See application file for complete search history.

(56) References Cited

U.S. PATENT DOCUMENTS

| 7,110,218 B2 | 9/2006 | Narumi et al. | |
| 2007/0230052 A1* | 10/2007 | Ajan | G11B 5/66 360/131 |
| 2007/0274011 A1* | 11/2007 | Ohta | B82Y 10/00 360/328 |
| 2009/0197122 A1* | 8/2009 | Inamura | G11B 5/65 428/812 |
| 2011/0249360 A1* | 10/2011 | Nunokawa | G11B 5/1278 360/75 |

(Continued)

*Primary Examiner* — Allen T Cao
(74) *Attorney, Agent, or Firm* — Kim & Stewart LLP (57) ABSTRACT

A magnetic recording apparatus includes a disk-shaped recording medium with a magnetic recording layer, and a recording head that magnetically writes data onto the magnetic recording layer and includes a main magnetic pole, a write shield facing the main magnetic pole and positioned with a writing gap disposed between the main magnetic pole and the write shield, and a magnetic flux control layer disposed inside the write gap between the main magnetic pole and the writing shield. The magnetic flux control layer includes a first layer including a first metal and contacting one of the main magnetic pole and the writing shield, a second control layer, and a third layer including a second metal and contacting the other one of the main magnetic pole and the writing shield. The second control layer includes a magnetic metal and contacts the first layer and the third layer.

19 Claims, 8 Drawing Sheets

(56) References Cited

U.S. PATENT DOCUMENTS

| | | | |
|---|---|---|---|
| 2011/0268991 A1* | 11/2011 | Benakli | G11B 5/115 |
| | | | 428/810 |
| 2016/0314809 A1 | 10/2016 | Taguchi et al. | |
| 2017/0186452 A1 | 6/2017 | Matsumoto et al. | |
| 2018/0268848 A1* | 9/2018 | Narita | G11B 5/3983 |
| 2019/0066717 A1* | 2/2019 | Ohtake | G11B 5/3153 |

* cited by examiner

MAGNETIC RECORDING APPARATUS

CROSS-REFERENCE TO RELATED APPLICATION

This application is based upon and claims the benefit of priority from Japanese Patent Application No. 2017-243988, filed Dec. 20, 2017, the entire contents of which are incorporated herein by reference.

FIELD

Embodiments described herein relate generally to a magnetic recording apparatus having a magnetic recording head.

BACKGROUND

A magnetic disk drive, which is a disk device, includes a disk-shaped recording medium (that is, a magnetic disk, and a magnetic head that reads/writes information onto the magnetic disk) disposed inside a case or housing. The magnetic head includes, for example, a recording (or write) head and a read head (reading element). The recording head has a main magnetic pole that generates a writing magnetic field. The recording head also includes a writing shield and a side shield, which face each other and are separated from the main magnetic pole by a gap (the writing gap).

In recent years, there is a tendency that the coercivity (or coercive force) of a recording medium increases as the recording density of the disk device becomes higher. As the coercive force of the recording medium increases, a writing magnetic field magnitude required for writing to be performed on the recording medium also increases. Making the writing gap length of the writing head larger is considered as a method for increasing a recording density. However, when the writing gap length is made larger, writing resolution decreases, thereby losing the density. Conversely, the recording density can be improved by making the writing gap length smaller, but in so doing, the magnetic field magnitude decreases. As described above, in order for the recording density of a recording medium to become higher, a larger coercive force is associated with the recording medium. As a result, a decrease in the magnetic field magnitude attributable to the narrowed writing gap of the recording head becomes a problem.

DETAILED DESCRIPTION

Embodiments provide a magnetic recording apparatus that can achieve a higher recording density.

According to an embodiment, a magnetic recording apparatus includes a disk-shaped recording medium that has a magnetic recording layer formed thereon, and a recording head that magnetically writes data onto the magnetic recording layer and includes a main magnetic pole, a write shield facing the main magnetic pole and positioned with a writing gap disposed between the main magnetic pole and the write shield, and a magnetic flux control layer disposed inside the write gap between the main magnetic pole and the writing shield. The magnetic flux control layer includes a first layer that includes a first metal and is in contact with one of the main magnetic pole and the writing shield, a second control layer, and a third layer that includes a second metal and is in contact with the other one of the main magnetic pole and the writing shield. The second control layer includes a magnetic metal and is in contact with the first layer and the third layer.

Hereinafter, a magnetic recording apparatus according to an embodiment will be described with reference to the drawings.

The disclosure is merely an example, and appropriate modifications that do not depart from the spirit of the disclosure and can be easily conceived by those skilled in the art are included in the scope of the disclosure, as a matter of course. In addition, in order to make description clearer, the width, the thickness, and the shape of each unit may be schematically illustrated in the drawings compared to actual forms. However, these are merely examples and do not limit the interpretation of the present disclosure. In addition, in the present disclosure and each drawing, the same elements already described with reference to the previous drawings will be assigned with the same reference labels, and detailed description thereof will be omitted as appropriate.

First Embodiment

Figure 1:
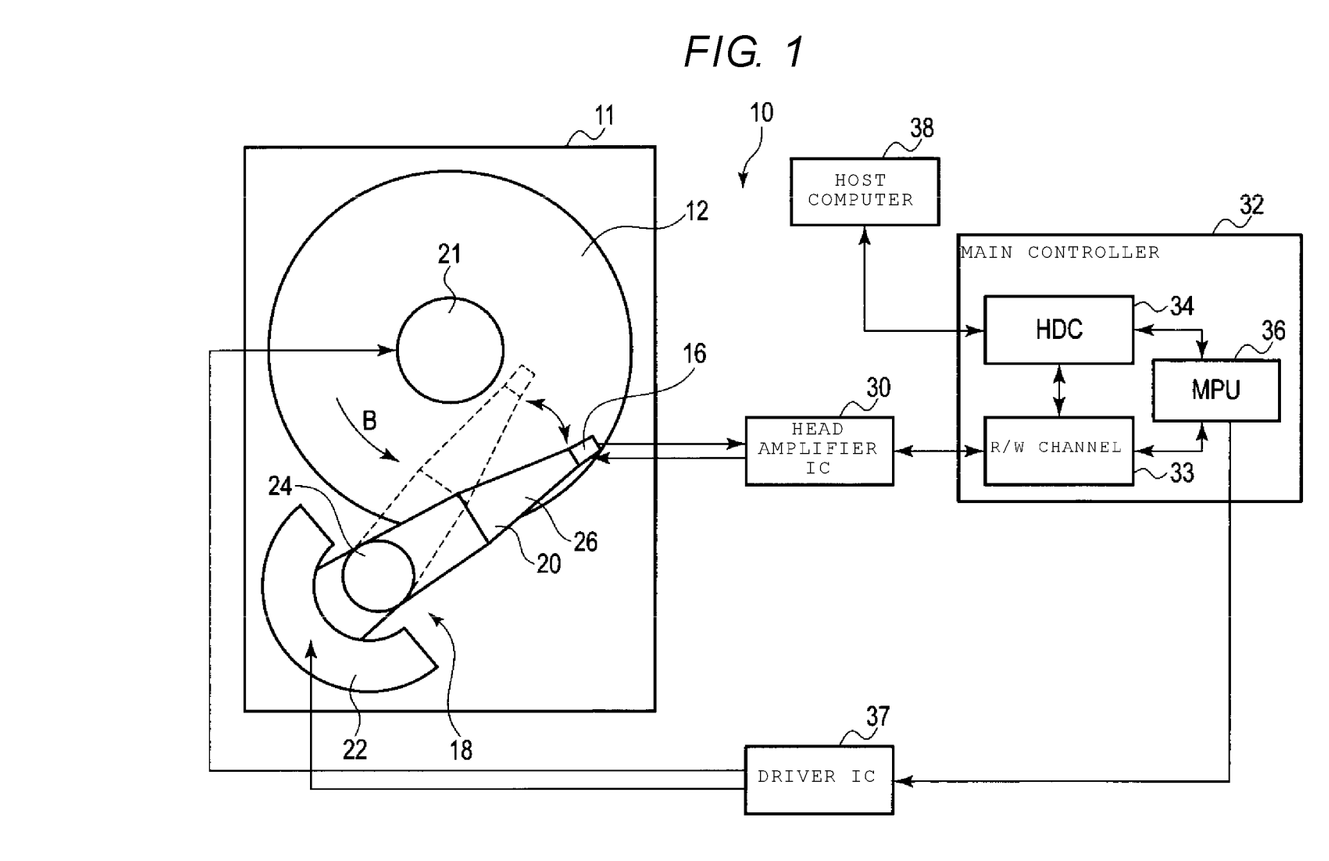
FIG. 1 is a block diagram schematically showing a hard disk drive (HDD) according to an embodiment.

A hard disk drive (HDD) according to the embodiment will be described in detail as an example of the magnetic recording apparatus. FIG. 1 is a block diagram schematically showing the HDD according to a first embodiment, and FIG. 2 is a side view illustrating a magnetic head suspended above a magnetic disk.

As illustrated in FIG. 1, an HDD 10 includes a rectangular housing 11, a magnetic disk 12, which is a recording medium disposed inside the housing 11, a spindle motor 21 that supports and rotates the magnetic disk 12, and a plurality of magnetic heads 16 that perform reading and writing of data with respect to the magnetic disk 12. The HDD 10 includes a head actuator 18 that moves and positions the magnetic heads 16 onto any track on the magnetic disk 12. The head actuator 18 includes a carriage assembly 20 that movably supports the magnetic heads 16 and a voice coil motor (VCM) 22 that pivots the carriage assembly 20.

The HDD 10 includes a head amplifier IC 30, a main controller 32, and a driver IC 37. The head amplifier IC 30 is included, for example, in the carriage assembly 20, and is electrically connected to the magnetic heads 16. The main controller 32 and the driver IC 37 are configured, for example, as a control circuit substrate (not illustrated) that is disposed on the back surface of the housing 11. The main controller 32 includes an R/W channel 33, a hard disk controller (HDC) 34, and a microprocessor (MPU) 36. The main controller 32 is electrically connected to the magnetic heads 16 via the head amplifier IC 30. The main controller 32 is electrically connected to the VCM 22 and the spindle motor 21 via the driver IC 37. The HDC 34 can be connected to a host computer 38.

Figure 2:
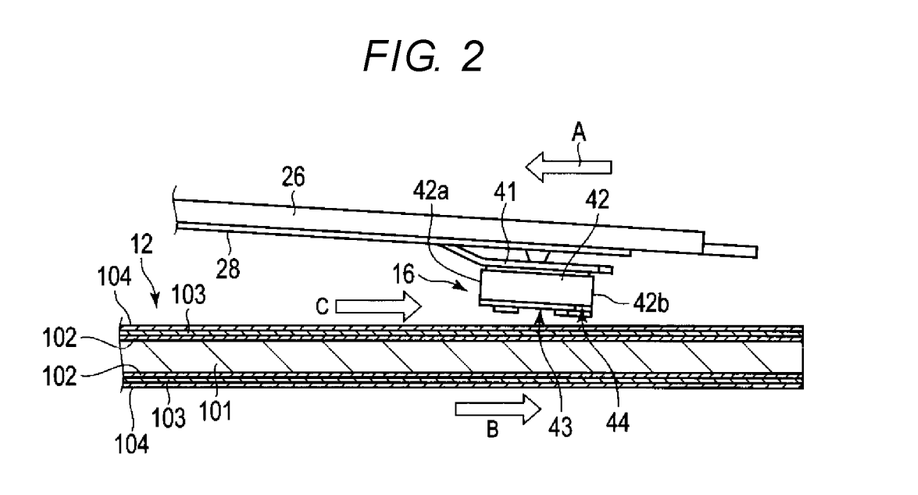
FIG. 2 is a side view illustrating a magnetic head, a suspension, and a magnetic disk in the HDD.

As illustrated in FIGS. 1 and 2, the magnetic disk 12 is configured as a vertical magnetic recording medium. The magnetic disk 12 has, for example, a substrate 101 configured with a nonmagnetic body formed in a disc shape and having a diameter of approximately from 65 mm to 98 mm. On each surface of the substrate 101, a soft magnetic layer 102 is stacked, and is a ground layer containing a material having soft magnetic properties. Above the soft magnetic layer 102, a magnetic recording layer 103 and a protective film 104 are subsequently stacked. The magnetic recording layer 103 has a magnetic anisotropy in a direction perpendicular to the surface of the magnetic disk 12. The magnetic recording layers 103 contain, for example, CoCrPtTa, CoCrPtB, and CoCr-based alloys, and have a coercive force of at least 5.2 kOe, more preferably, at least 5.4 kOe. The magnetic disk 12 is coaxially fitted to the hub of the spindle motor 21. The spindle motor 21 rotates the magnetic disk 12 at a predetermined speed in direction indicated by arrow B.

The carriage assembly 20 has a bearing unit 24 pivotably or rotatably fixed to the housing 11 and a plurality of suspensions 26 that extend from the bearing unit 24. As illustrated in FIG. 2, the magnetic heads 16 are supported by a respective extended end of one of the suspensions 26. The magnetic heads 16 are electrically connected to the head amplifier IC 30 via a wiring member 28 (shown in FIG. 2) disposed in the carriage assembly 20.

As illustrated in FIG. 2, the magnetic heads 16 are configured as levitated heads. The magnetic heads 16 each have a substantially rectangular parallelepiped slider 42 and a head unit 44 for writing and reading, which is formed on an end portion of an outflow end (trailing end) side of the slider 42. The slider 42 is configured, for example, with a sintered body (AlTiC) of alumina and titanium carbide. The head unit 44 is formed by depositing or otherwise stacking a plurality of thin films onto each other. Each magnetic head 16 is fixed to a gimbal spring 41 disposed on a tip portion of a respective one of suspensions 26.

The slider 42 has a rectangular disk-facing surface (medium-facing surface or air bearing surface (ABS)) 43 facing the surface of the magnetic disk 12. Airflow C generated between the disk surface and the ABS 43 by the rotation of the magnetic disk 12 maintains the slider 42 in a state of suspension at a predetermined distance from the surface of the magnetic disk 12. The direction of the airflow C coincides with a rotation direction B of the magnetic disk 12. The slider 42 has a leading end 42a located on an inflow side of the airflow C and a trailing end 42b located on an outflow side of the airflow C. As the magnetic disk 12 rotates, the magnetic heads 16 travel in a direction indicated by an arrow A (head travelling direction) with respect to the magnetic disk 12, that is, in the opposite direction to the rotation direction B of the disk.

Figure 3:
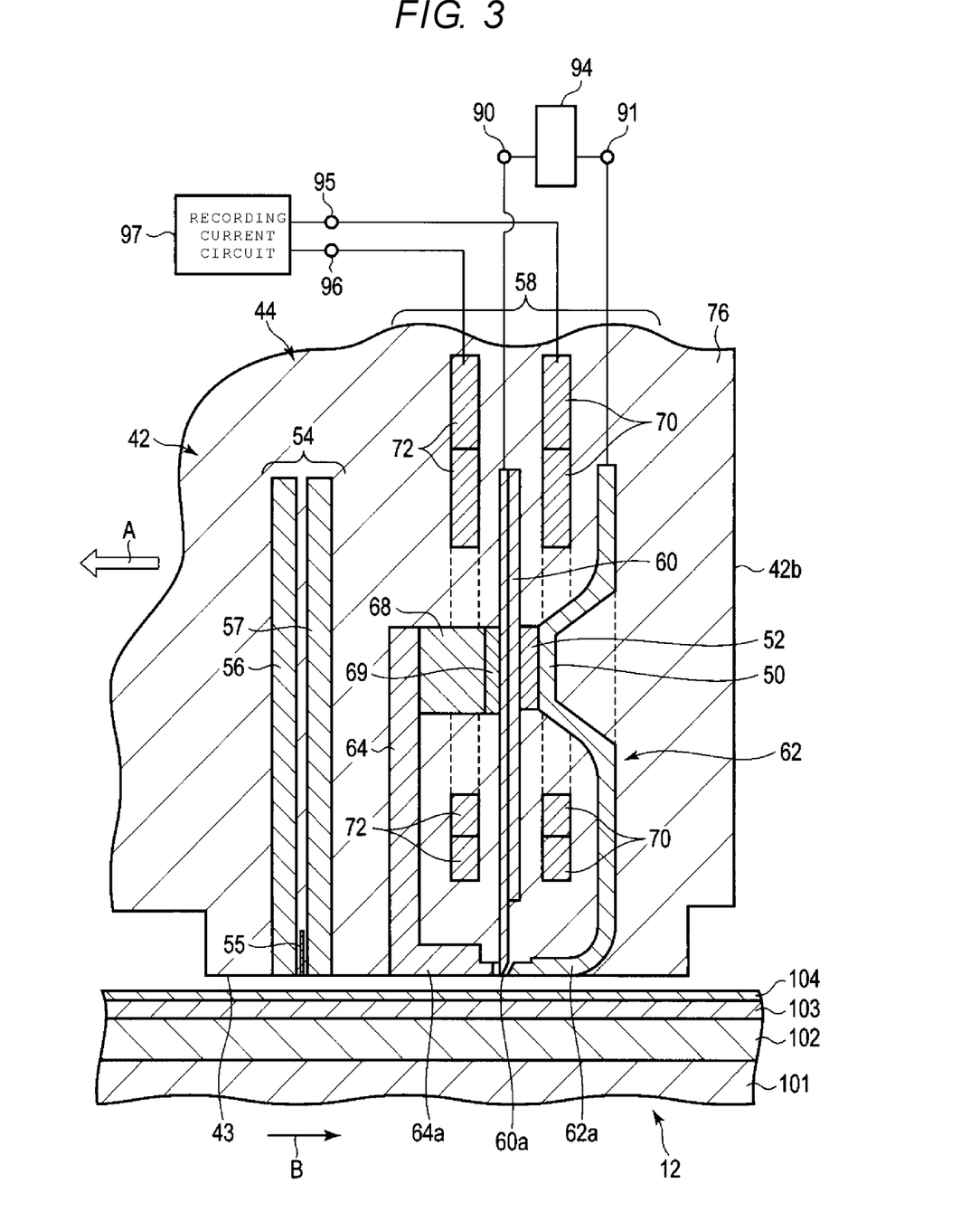
FIG. 3 is a sectional view illustrating an enlarged head unit of the magnetic head.

FIG. 3 is an enlarged sectional view illustrating the head unit 44. As illustrated in FIG. 3, the head unit 44 is formed as a magnetic head having a playback head (reading head) 54 and a separate writing head 58 that are each formed in a thin film process in the trailing end 42b of the slider 42. The reading head 54 and the writing head 58 are covered with a nonmagnetic protective insulating film 76, except for portions exposed to the ABS 43 of the slider 42. The protective insulating film 53 forms the outer surfaces of the head unit 44.

The reading head 54 includes a magnetic film 55 having magnetoresistive attributes and shield films 56 and 57, which are positioned such that the magnetic film 55 is sandwiched therebetween on a trailing side and a leading side of the magnetic film 55. The lower ends (i.e., the ends closest to the ABS 43) of the magnetic film 55 and the shield films 56 and 57 are exposed to the ABS 43 of the slider 42.

Figure 4:
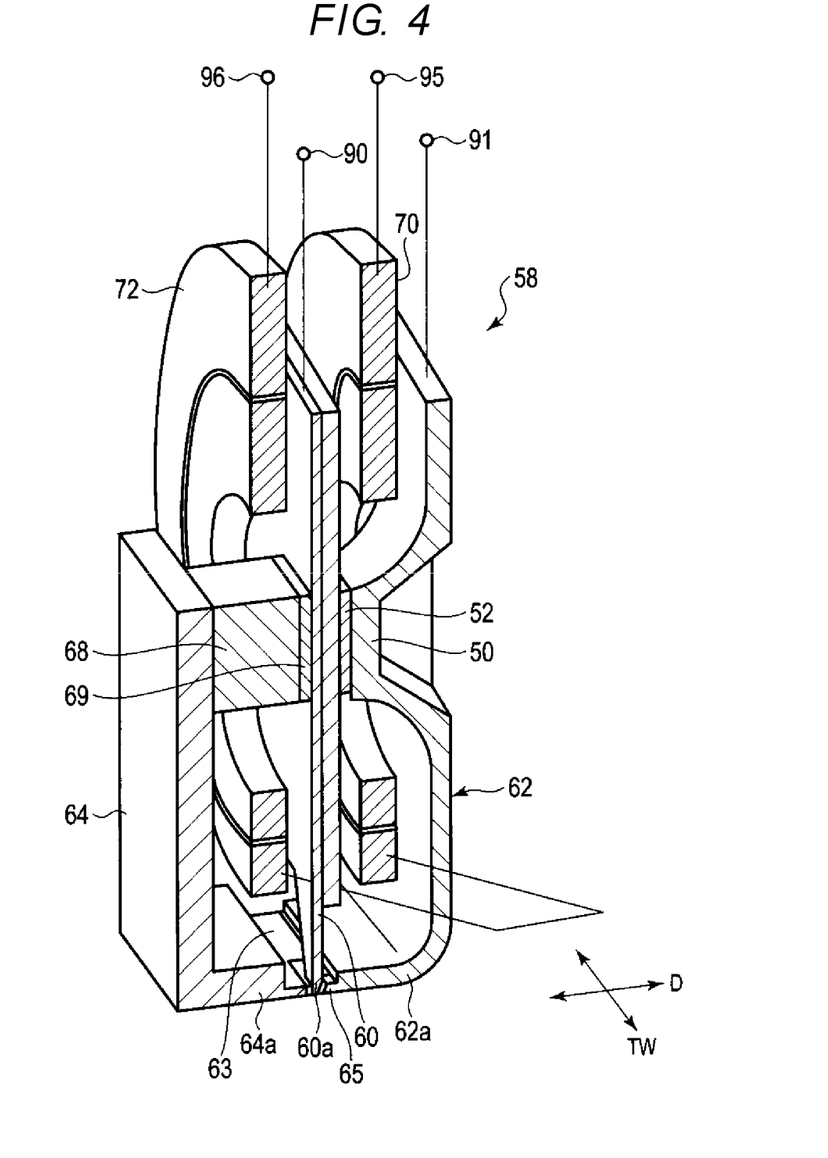
FIG. 4 is a perspective view illustrating main configuration elements of a recording head of the magnetic head, which are partially cut.
Figure 5:
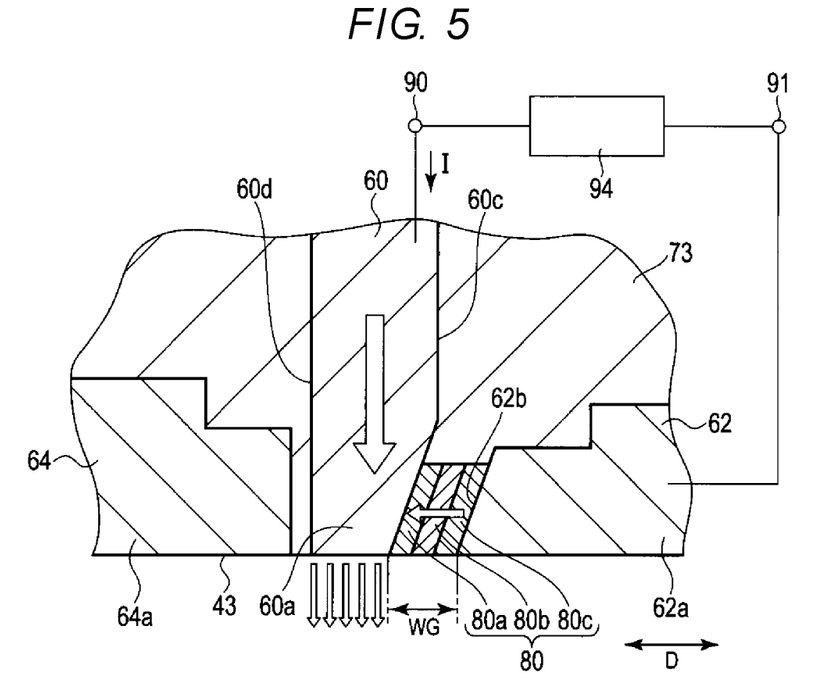
FIG. 5 is a sectional view illustrating an enlarged tip portion of the recording head.
Figure 6:
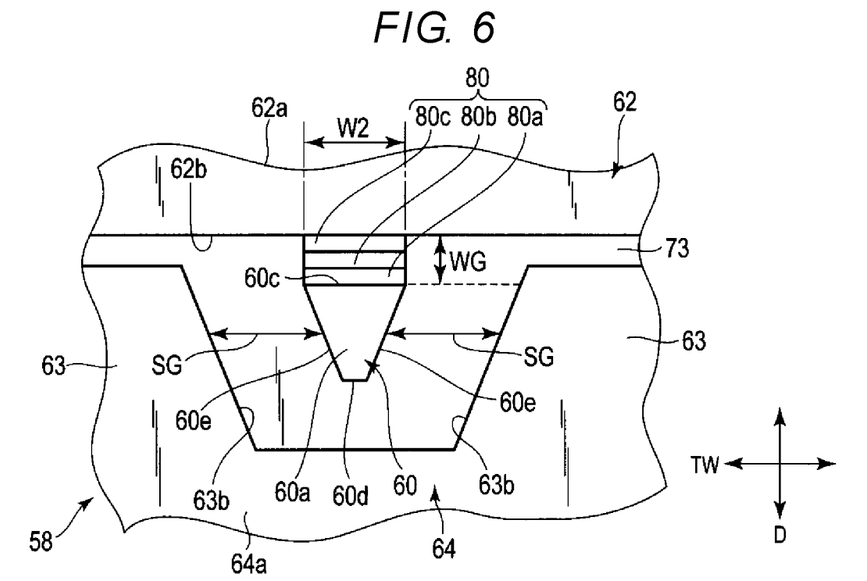
FIG. 6 is a plan view of the recording head seen from an ABS side.

The write head 58 is disposed on a trailing end 42b side of the slider 42 relative to the reading head 54. FIG. 4 is a perspective view illustrating elements of the write head 58, which are cross-sectioned, FIG. 5 is an enlarged sectional view illustrating a tip portion of the write head 58, and FIG. 6 is a plan view illustrating the enlarged write head 48 seen from an ABS 43 side of the head unit 44.

As illustrated in FIGS. 3 and 4, the write head 58 has a main magnetic pole 60 containing a high-saturation flux density material, a trailing shield (writing shield) 62 containing a soft magnetic material, a pair of side shields 63, and a leading shield 64. The main magnetic pole 60 extends substantially perpendicularly to the surface of the magnetic disk 12 and the ABS 43. A tip portion 60a on an ABS 43 side of the main magnetic pole 60 tapers narrowly (in a funnel shape) toward the ABS 43. The main magnetic pole 60 generates a recording magnetic field in a direction perpendicular to the surface of the magnetic disk 12.

The trailing shield 62 is disposed with a writing gap WG (gap length along a down-track direction D) left on the trailing side of the main magnetic pole 60, and is included to efficiently close a magnetic path via the soft magnetic layers 102 immediately below the main magnetic pole 60. The each of the pair of side shields 63 is positioned with a respective side gap SG that separates each side shield 63 in a in a track width direction TW from the main magnetic pole 60. Thus, the pair of side shields 63 face each other along the track width direction TW. The leading shield 64 is positioned with a gap disposed between the leading shield 64 and the main magnetic pole 60, with the gap located on the leading edge side of the main magnetic pole and the trailing edge side of the leading shield 64. In the embodiment, the side shields 63 and the leading shield 64 may be formed with a soft magnetic material, and may be integrated.

The trailing shield 62 is formed in substantially an L-shape, and has a first connection unit 50 connected to the main magnetic pole 60. The first connection unit 50 is connected, via a non-conductive body 52, to an upper portion of the main magnetic pole 60, that is, to an upper portion (back gap) of the main magnetic pole 60 that is positioned away from the ABS 43. The leading shield 64 has a first connection unit 68 bonded to the main magnetic pole 60 via a non-conductive body (insulating body) 69 at a position (back gap) that is positioned away from the magnetic disk 12. The first connection unit 68 is configured with, for example, a soft magnetic body, and forms a magnetic circuit with the main magnetic pole 60 and the leading shield 64. In addition, at the position of the first connection unit 68, the insulating body 69 electrically insulates the main magnetic pole 60 from the leading shield 64.

The recording head 58 has first writing coils 70 and second writing coils 72 both of which are for allowing magnetic flux to flow through the main magnetic pole 60. The first writing coils 70 are wound around a first magnetic core including the main magnetic pole 60 and the trailing shield 62, and the second writing coils 72 are wound around a second magnetic core including the main magnetic pole 60 and the leading shield 64. The first writing coils 70 and the second writing coils 72 are connected to terminals 95 and 96 respectively, and the terminals 95 and 96 are connected to a writing current circuit 97. The second writing coils 72 are connected to the first writing coils 70 in series. When writing a signal in the magnetic disk 12, a predetermined current is supplied from the writing current circuit 97 to the first writing coils 70 and the second writing coils 72, magnetic flux is caused to flow through the main magnetic pole 60, and thereby a magnetic field is generated.

As illustrated in FIGS. 5 and 6, the tip portion 60a of the main magnetic pole 60 has a trailing side end surface 60c located on the trailing end side of the main magnetic pole 60, a leading side end surface 60d facing the trailing side end surface 60c, and two side surfaces 60e. A tip surface of the main magnetic pole 60 is exposed to the ABS 43 of the slider 42. The trailing side end surface 60c at the tip portion 60a extends away from ABS 43, but is oriented to incline at an angle that is not perpendicular to the ABS 43. As shown in FIG. 3, the trailing side end surface 60c extends away from the ABS 43 and in the trailing end direction. Both side surfaces 60e are inclined and extend away from the ABS 43 along a central axis of the main magnetic pole 60. As shown in FIG. 6, side surfaces 60e are inclined with respect to the down track direction D.

A width W2 of the main magnetic pole 60 in the track width direction TW at the tip portion 60a (i.e., the width of the trailing side end surface 60c) is 55 nm or less, for example, approximately 30 to 55 nm.

A tip portion 62a of the trailing shield 62 is formed in an elongated rectangular shape. The lower end surface of the trailing shield 62 forms a portion of the ABS 43 of the slider 42. A leading side end surface 62b of the tip portion 62a (i.e., a surface of the tip portion 62a that faces toward the leading end 42a and the main magnetic pole 60) extends in the track width direction TW. The leading side end surface 62b is inclined (i.e., is not perpendicular to the ABS 43), as shown in FIG. 5, and extends away ABS 43. At the tip portion 60a of the main magnetic pole 60, the leading side end surface 62b faces, in almost parallel, the trailing side end surface 60c of the main magnetic pole 60, as shown in FIG. 5. The writing gap WG is disposed between the leading side end surface 62b and the trailing side end surface 60c. The length (length in the down track direction D) of the writing gap WG is set to 18.5 nm or less, for example, approximately 14.5 to 18.5 nm. The trailing side end surface 60c of the main magnetic pole 60 and the leading side end surface 62b of the trailing shield 62 may extend in the direction perpendicular to the ABS 43 and parallel to the track width direction TW.

In the embodiment, the pair of side shields 63 is integrated with the leading shield 64 as a single soft magnetic body. As shown in FIG. 6, the pair of side shields 63 extend from the leading shield 64 toward the trailing shield 62. Each of the pair of side shields 63 is physically divided from the main magnetic pole 60 in the track width direction TW, and each of the pair of side shields 63 is magnetically and electrically connected to the leading shield 64. Each of side surfaces 63b of the side shields 63 faces and is substantially parallel to a respective side surface 60e of the main magnetic pole 60 with a respective side gap SG positioned therebetween. Tip surfaces of the side shields 63 form a portion of the ABS 43.

As illustrated in FIGS. 5 and 6, the recording head 58 includes a magnetic flux control layer 80 disposed between the main magnetic pole 60 and the trailing shield 62 within the writing gap WG. The magnetic flux control layer 80 is formed from a stack of a plurality of metal layers. The magnetic flux control layer 80 has, for example, a first layer (an intermediate layer) 80a, a second control layer (a permeability adjustment layer) 80b, and a third layer (a conductive cap layer) 80c, which are stacked in this order from the main magnetic pole 60 toward the trailing shield 62, as shown in FIG. 5.

At least one of a first group including Cu, Au, Ag, Al, Ir, and NiAl alloys in a metallic phase, and a substance that does not hinder spin conduction may be used as the first layer (intermediate layer) 80a. In addition, the first layer 80a may include at least one element from a second group including Pt, W, Ru, Ta, and Pd. For example, a structure in which a portion or layer including at least one element selected from the first group and a portion or layer including at least one element selected from the second group are stacked may be adopted. For example, a stacked body of Cu and Ta may be used. The first layer 80a is in contact with or abuts against the trailing side end surface 60c of the main magnetic pole 60. The second control layer (permeability adjustment layer) 80b is stacked on or otherwise formed on or in contact with the first layer 80a, and is disposed between the first layer 80a and the third layer 80c. The second control layer 80b may be a metal layer. A magnetic metal selected from Fe, Co, and Ni and a soft magnetic metal alloy including at least one of those may be used as the second control layer.

The third layer (conductive cap layer) 80c is stacked on or otherwise formed on or in contact with the second control layer 80b, and is also in contact with or abuts against the leading side end surface 62b of the trailing shield 62. At least one of the first group including Cu, Au, Ag, Al, Ir, and NiAl alloys in a metallic phase, and a substance that does not hinder spin conduction may be used as the third layer 80c. In addition, the third layer 80c may include at least one element from the second group including Pt, W, Ru, Ta, and Pd. For example, a structure of the third layer 80c may be adopted in which a portion including at least one element selected from the first group and a portion including at least one element selected from the second group are stacked. For example, a stacked body of Cu and Ta may be used for such a structure.

The width of the magnetic flux control layer 80 is almost the same as the width W2 of the main magnetic pole 60 in the track width direction TW, as shown in FIG. 6. The height of the magnetic flux control layer 80 (height in a direction intersecting the ABS 43—such a height is visible in FIG. 5) is approximately the same as the height of the writing gap WG. The thicknesses of the first layer 80a, the second control layer 80b, and the third layer 80c are, for example, approximately 3 nm, 10 nm, and 3 nm, respectively.

The tip portion 60a of the main magnetic pole 60 and the tip portion 62a of the trailing shield 62 are electrically energized via the magnetic flux control layer 80. The lower end surfaces of the first, second, and third layers 80a, 80b, and 80c are exposed to the ABS 43 of the slider, i.e., these lower end surfaces form a portion of the ABS 43. In some embodiments, the order of stacking of the first layer 80a and the third layer 80c may be the opposite of that set forth above. That is, the first layer 80a may be in contact with the trailing shield 62, and the third layer 80c may be in contact with the main magnetic pole 60.

Except for a portion occupied by the magnetic flux control layer 80, a non-magnetic insulating body is disposed in spaces between the main magnetic pole 60 and the tip portion 62a of the trailing shield 62 (see FIG. 5), between the main magnetic pole 60 and the leading shield 64 (see FIG. 5), and between the main magnetic pole 60 and the side shields 63 (see FIG. 6). For example, the non-magnetic insulating body may be a protective insulating film 73 containing alumina and silicon oxide. The protective insulating film 73 forms the outer surfaces of the recording head 58.

As illustrated in FIGS. 3 and 5, the recording head 58 has connection terminals 90 and 91 for energizing the main magnetic pole 60 and the trailing shield 62. The connection terminals 90 and 91 are connected to the main magnetic pole 60 and the trailing shield 62, respectively. A control unit of the HDD has a power supply 94 connected to the connection terminals 90 and 91. An electric circuit is formed that can be energized through the connection terminal 90, the main magnetic pole 60, the magnetic flux control layer 80, the trailing shield 62, and the connection terminal 91.

The magnetic flux control layer 80 is energized from the power supply 94 via the main magnetic pole 60 and the trailing shield 62. That is, the first layer 80a, the second control layer 80b, and the third layer 80c are energized in this order. Then, spin torque T1 on a main magnetic pole 60 side and spin torque T2 on a trailing shield 62 side act on two interfaces between which the second control layer 80b is sandwiched. For example, when the materials and thicknesses of the first layer 80a and the third layer 80c are adjusted such that spin polarizability on the main magnetic pole 60 side becomes 0.3 and spin polarizability on the trailing shield 62 side becomes 0.5, the magnitude of antiparallel spin torque T1/T2 changes by making a current greater. When spin torque in an opposite direction to the direction of the writing gap magnetic field becomes greater than spin torque in the same direction as the writing gap magnetic field, the magnetization of the second control layer 80b is reversed, and the direction of the magnetic field is locally reversed compared to the writing gap magnetic field. Accordingly, the magnetic flux control layer 80 generates magnetic flux from the trailing shield 62 toward the main magnetic pole 60. That is, the magnetic flux control layer 80 generates magnetic flux (indicated by the smaller white arrow in FIG. 5) in the opposite direction to magnetic flux (indicated by the larger downward pointing white arrow in FIG. 5) from the main magnetic pole 60 toward the trailing shield 62. The magnetic flux generated by the magnetic flux control layer 80 prevents the flow of at least a portion of the magnetic flux from the main magnetic pole 60 from directly flowing from the main magnetic pole 60 to the trailing shield 62 through the writing gap WG. Accordingly, a writing magnetic field and writing magnetic flux generated from the main magnetic pole 60 can be efficiently applied to the magnetic recording layer of the magnetic disk 12, and thus the writing magnetic field magnitude with respect to the magnetic disk 12 is increased.

When the first layer 80a is disposed on the trailing shield 62 side and the third layer 80c is disposed on the main magnetic pole 60 side, the direction of energization becomes the opposite, and thus the trailing shield 62, the magnetic flux control layer 80, and the main magnetic pole 60 are energized in this order. However, even in this case, the magnetic flux control layer 80 generates magnetic flux in a direction from the trailing shield 62 toward the main magnetic pole 60 by means of energization.

In the HDD configured as described above, even when the writing gap WG between the main magnetic pole 60 and the trailing shield 62 is narrowed in the recording head 58, magnetic flux directly flowing from the main magnetic pole 60 to the trailing shield can be reduced by the presence of the magnetic flux control layer 80 in the writing gap WG. For this reason, the recording magnetic field can be efficiently applied from the main magnetic pole 60 to a recording medium, and the recording magnetic field magnitude can be improved. Accordingly, the HDD can perform magnetic recording with a high recording density with respect to the magnetic recording layer with a high coercive force.

Hereinafter, operational effects of the HDD will be described in further detail.

Figure 7:
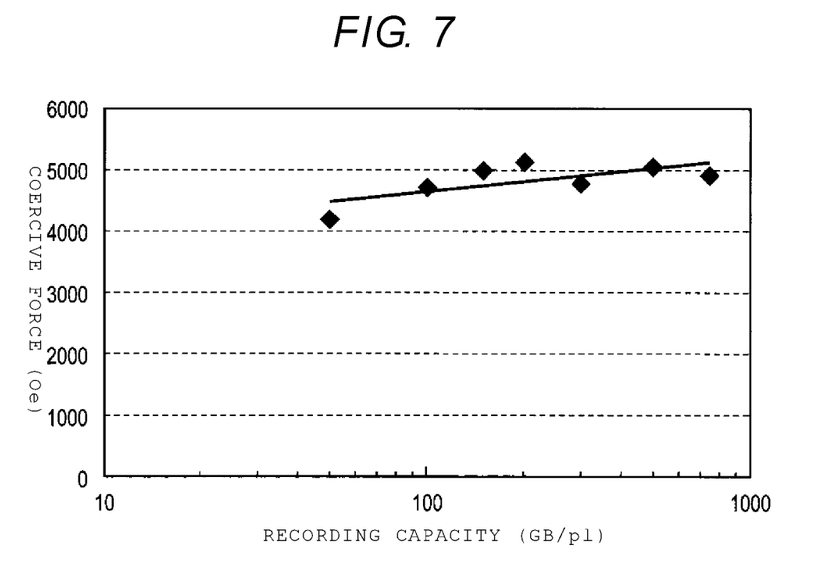
FIG. 7 is a graph showing a relationship between recording capacity and a coercive force of a recording medium.
Figure 8:
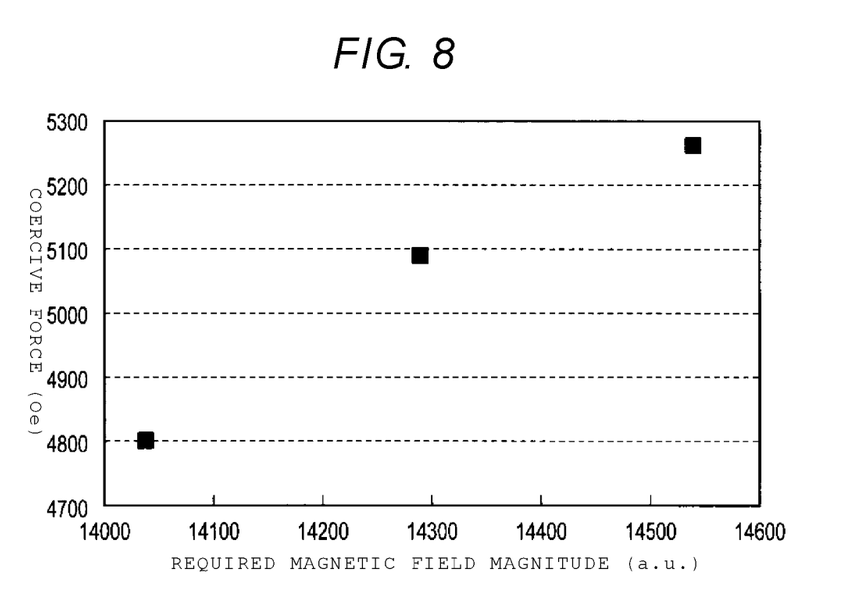
FIG. 8 is a graph showing a relationship between the coercive force of the recording medium and a magnetic field magnitude required for writing.

FIG. 7 shows a relationship between the recording density (recording capacity) of the recording medium (magnetic disk) and a coercive force of the magnetic recording layer. As shown in FIG. 7, there is a tendency of the coercive force of the magnetic recording layer to increase as the recording density of the recording medium increases. FIG. 8 shows a relationship between a recording magnetic field required for magnetic recording (i.e., magnetic field magnitude) and a coercive force of the magnetic recording layer. As shown in FIG. 8, as the coercive force increases, the required magnetic field magnitude increases.

Figure 9:
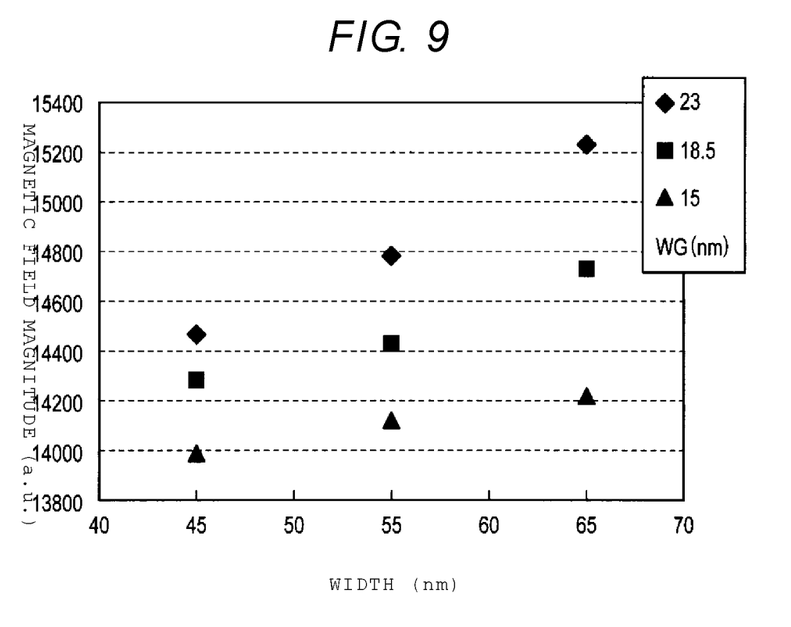
FIG. 9 is a graph showing a relationship between a track direction width of a main magnetic pole and a magnetic field magnitude, in terms of a plurality of writing gap lengths.

FIG. 9 shows a relationship between the width W2 of the main magnetic pole in the track width direction and the magnetic field magnitude, in terms of various writing gap lengths. As shown in FIG. 9, the magnetic field magnitude increases by making the width W2 larger or by making the writing gap length larger. However, when the width W2 is made larger, the recording magnetic field widens in the track width direction, thereby reducing recording density. In addition, when the writing gap length becomes larger, recording resolution decreases, thereby losing a recording density.

Figure 10:
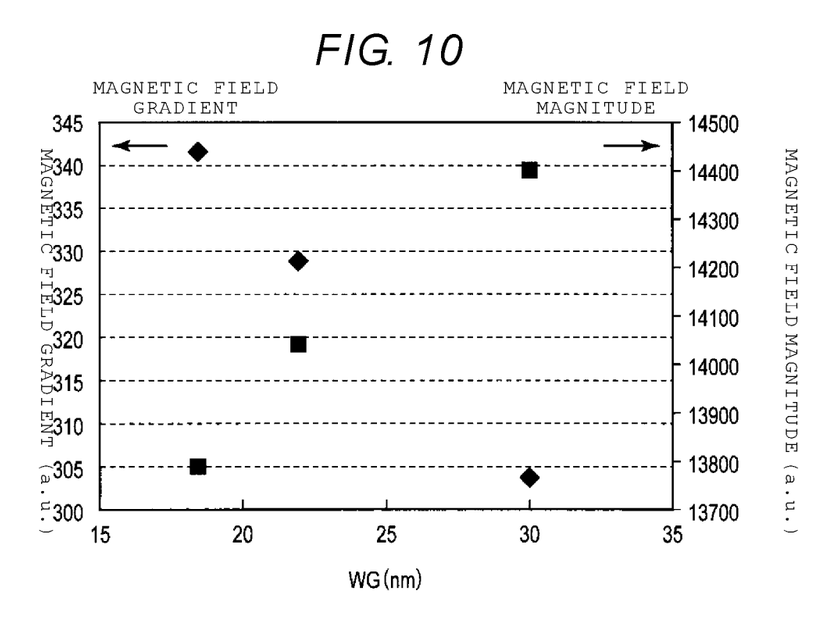
FIG. 10 is a graph showing a relationship among the writing gap length, a magnetic field gradient, and the magnetic field magnitude.
Figure 11:
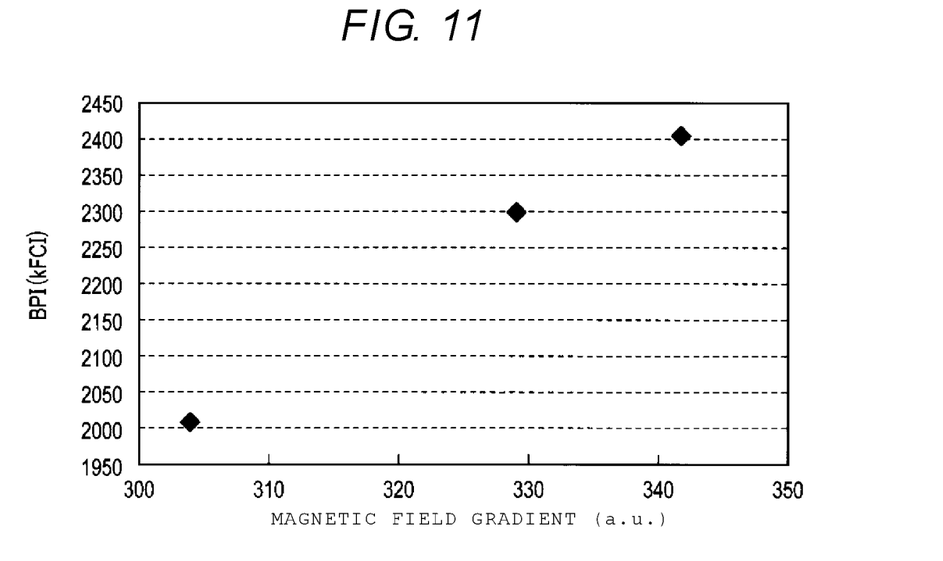
FIG. 11 is a graph showing a relationship between the magnetic field gradient and a reachable recording density (resolution) BPI.

FIG. 10 shows a relationship between a writing gap length, a magnetic field gradient, and a magnetic field magnitude, and FIG. 11 shows a relationship between a magnetic field gradient and a reachable recording density (resolution) BPI. As shown in FIG. 10, when the writing gap WG is narrowed, the magnetic field gradient becomes steeper while the magnetic field magnitude decreases. As shown in FIG. 11, a steeper magnetic field gradient leads to an improvement in the recording density. In order for the recording density to improve, an increase in the magnetic field gradient, that is, a narrowed writing gap is required. However, as shown in FIGS. 7 and 8, in order for the recording density to become higher, a larger coercive force of the magnetic recording layer is required. In the case of a larger coercive force, an increase in the magnetic field magnitude is required. For this reason, the decrease in the magnetic field magnitude attributable to the narrowed writing gap is a problem, and thus it is difficult to achieve an improvement in the recording density. It is noted that the specific relationship between the magnetic field gradient or the magnetic field magnitude and the recording density described above changes according to measurement conditions and circumstances, but the above-described trends still hold true.

Figure 12:
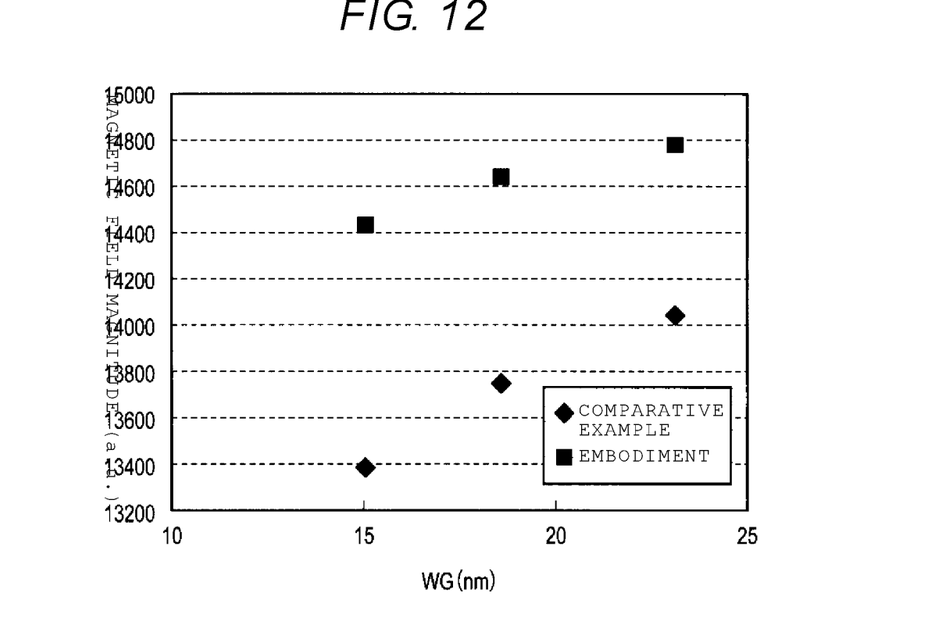
FIG. 12 is a graph showing a relationship between a writing gap and the magnetic field magnitude in terms of the recording head of the HDD according to the embodiment and a recording head according to a comparative example in which a magnetic flux control layer is not provided.

As described above, in the HDD according to the embodiment, the magnetic flux control layer 80 is disposed in the writing gap WG to reduce magnetic flux leaking from the main magnetic pole 60 to the trailing shield 62. For this reason, the recording magnetic field generated from the main magnetic pole 60 can be efficiently applied to a recording medium, and an improvement in the magnetic field magnitude can be achieved without increasing the writing gap. FIG. 12 shows a relationship between the writing gap WG and the magnetic field magnitude in terms of the writing head according to the embodiment and a writing head according to a comparative example in which the magnetic flux control layer is not present in the writing gap. As shown in FIG. 12, the recording head according to the embodiment can obtain a high magnetic field magnitude compared to the comparative example. As shown, this higher magnetic field magnitude is achieve with any writing gap length. As described above, in the HDD according to the embodiment, a narrowed writing gap can be implemented in a magnetic head 16 and a concomitant improvement in the recording density can be achieved without decreasing the magnetic field magnitude.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the leading shield may be omitted from the magnetic recording head. The materials, shapes, and sizes of elements configuring a disk device are not limited to the embodiment described above, and various modifications may be made thereto if necessary.

What is claimed is:

1. A magnetic recording apparatus comprising:
   a disk-shaped recording medium that has a magnetic recording layer formed thereon; and
   a recording head that magnetically writes data onto the magnetic recording layer and includes a main magnetic pole, a write shield facing the main magnetic pole and positioned with a writing gap disposed between the main magnetic pole and the write shield, and a magnetic flux control layer disposed inside the write gap between the main magnetic pole and the writing shield,
   wherein the magnetic flux control layer includes a first layer that includes a first metal and is in contact with one of the main magnetic pole and the writing shield, a second control layer, and a third layer that includes a second metal and is in contact with the other one of the main magnetic pole and the writing shield, the second control layer including a magnetic metal and being in contact with the first layer and the third layer.

2. The magnetic recording apparatus according to claim 1, wherein the first layer, the second control layer, and the third layer form a stack of materials disposed between the main magnetic pole and the writing shield.

3. The magnetic recording apparatus according to claim 1, wherein the first metal includes at least one metal selected from the group of metals consisting of Cu, Au, Ag, Al, Ir, and a NiAl alloy.

4. The magnetic recording apparatus according to claim 3, wherein the first metal further includes at least one metal selected from the group of metals consisting of Pt, W, Ru, Ta, and Pd.

5. The magnetic recording apparatus according to claim 4, wherein the first metal is configured as a stacked structure with a layer including a least one metal selected from the group of metals consisting of Cu, Au, Ag, Al, Ir, and a NiAl alloy and a layer including at least one metal selected from the group of metals consisting of Pt, W, Ru, Ta, and Pd.

6. The magnetic recording apparatus according to claim 1, wherein the second metal includes at least one metal selected from the group of metals consisting of Ta, Ru, Pt, W, Mo, and an alloy including at least one of Ta, Ru, Pt, W, Mo.

7. The magnetic recording apparatus according to claim 1, wherein the magnetic metal includes at least one magnetic metal selected from the group of magnetic metals consisting of Fe, Co, Ni, and a soft magnetic metal alloy including at least one of Fe, Co, and Ni.

8. The magnetic recording apparatus according to claim 1, wherein the recording head includes an electric circuit formed by a connection terminal to a power supply, the main magnetic pole, the magnetic flux control layer, and the write shield.

9. The magnetic recording apparatus according to claim 8, wherein the electric circuit, when energized, generates first magnetic flux from the main magnetic pole to the trailing shield and the magnetic flux control layer generates second magnetic flux from the trailing shield toward the main magnetic pole.

10. The magnetic recording apparatus according to claim 9, wherein the second magnetic flux prevents at least a portion of the first magnetic flux from flowing directly from the main magnetic pole to the trailing shield.

11. The magnetic recording apparatus according to claim 9, wherein the first layer is in contact with the main magnetic pole, the third layer is in contact with the write shield, and the second control layer is disposed between the first layer and the third layer.

12. The magnetic recording apparatus according to claim 11, wherein the order in which elements of the recording head are energized is: the main magnetic pole, the first layer, the second control layer, the third layer, and the writing shield.

13. The magnetic recording apparatus according to claim 9, wherein the first layer is in contact with the write shield, the third layer is in contact with the main magnetic pole, and the second control layer is disposed between the first layer and the third layer.

14. The magnetic recording apparatus according to claim 13, wherein the order in which elements of the recording head are energized is: the write shield, the first layer, the second control layer, the third layer, and the main magnetic pole.

15. The magnetic recording apparatus according to claim 1, wherein the recording head includes an air bearing surface facing the recording medium, and
the first layer, the second control layer, and the third layer each have a respective end surface that forms a portion of the air bearing surface.

16. The magnetic recording apparatus according to claim 1, wherein the recording medium includes a soft magnetic layer and the magnetic recording layer, which is disposed on the soft magnetic layer and has a magnetic anisotropy perpendicular to a recording medium surface.

17. The magnetic recording apparatus according to claim 1, wherein the magnetic recording layer has a coercive force larger than about 5.2 kOe.

18. The magnetic recording apparatus according to claim 1, wherein the main magnetic pole has a width in a track width direction that is between about 40 nm and about 55 nm.

19. The magnetic recording apparatus according to claim 1, wherein the writing gap has a width that is between about 16 nm to 18.5 nm.

* * * * *